No. 662,679. Patented Nov. 27, 1900.
L. W. PULLEN.
REVERSIBLE PRIMARY BATTERY.
(Application filed Sept. 16, 1899.)
(No Model.)
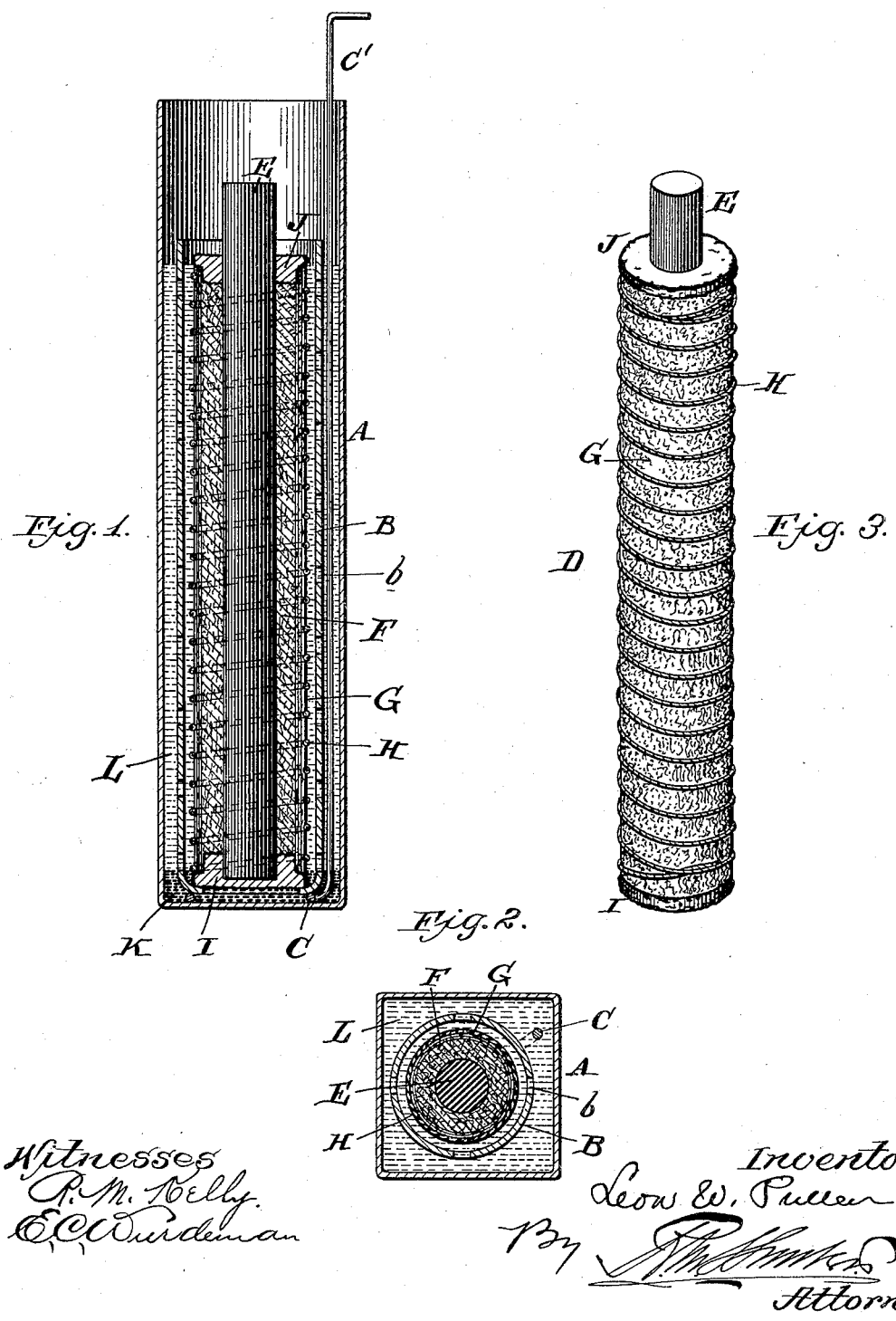

UNITED STATES PATENT OFFICE.

LEON W. PULLEN, OF CAMDEN, NEW JERSEY, ASSIGNOR TO THE PULLEN BATTERY AND ELECTRICAL MANUFACTURING COMPANY, OF NEW JERSEY.

REVERSIBLE PRIMARY BATTERY.

SPECIFICATION forming part of Letters Patent No. 662,679, dated November 27, 1900.

Application filed September 16, 1899. Serial No. 730,669. (No model.)

*To all whom it may concern:*

Be it known that I, LEON W. PULLEN, of Camden, county of Camden, State of New Jersey, have invented an Improvement in Reversible Primary Batteries, of which the following is a specification.

My invention has reference to reversible primary batteries; and it consists of certain improvements which are fully set forth in the following specification and shown in the accompanying drawings, which form a part thereof.

The object of my invention is to provide a suitable compact and inexpensive construction of battery having the mechanical structure and composition similar to the batteries set out in Letters Patent No. 585,699, dated July 6, 1897, and granted to me.

In carrying out my invention I provide a removable central structure containing the negative electrode substance and surrounding the same with a zinc electrode preferably made tubular and perforated and connecting with one of the terminals of the battery. The negative electrode and zinc tube are arranged one within the other and placed in a battery box or vessel containing dilute sulfuric acid. The negative element preferably consists of a carbon or other central conductor surrounded with an intimate mixture or depolarizing mass consisting of finely-divided coke and plumbago, concentrated sulfuric acid, and salt of manganese, and said mass being held in position about the central conductor by a wrapping of asbestos or other porous non-conducting sheet which is bound firmly in position by a suitable strand or cord which may be of amalgamated copper wire or an asbestos cord preferably saturated with an insulating compound, such as asphaltum.

My invention will be better understood by reference to the accompanying drawings, in which—

Figure 1 is a sectional elevation of a battery embodying my invention. Fig. 2 is a cross-sectional plan view of same, and Fig. 3 is a perspective view of the negative element removed.

A is the battery-box, which may be made of any suitable material

B is the tubular electrode, of zinc, which may be made with its wall perforated, as at *b*, and with or without a longitudinal division or vertical slit from top to bottom. It is more economical to form this zinc from a flat sheet. Hence I prefer to roll a sheet into tubular form, leaving a slit from one end to the other. This zinc positive electrode B rests upon a conductor C, extending to the bottom of the battery-box and having its free end brought out of the top of the box, as at C', to constitute one terminal in the battery. Placed within the said zinc electrode B is a negative electrode structure D. (Shown in Fig. 3.) This negative electrode structure comprises a central conductor E, of carbon or other suitable material which may act as a conductor. Surrounding this conductor E is a depolarizing mixture F, which is bound in position by a wrapper G, of sheet asbestos or other porous material unaffected by acid. This wrapper is bound in position by a wrapping of wire or cord H. If the wrapping-strand is of metal, it is preferably of amalgamated copper; but if it is desired to use a non-metallic cord it may be made of asbestos preferably saturated or impregnated with asphaltum or other plastic compound having insulating qualities and unaffected by sulfuric acid, so that when the negative electrode structure is placed in the battery-electrolyte it will not deteriorate.

The ends of the structure D are sealed by composition plugs I J, of any suitable insulating material, preferably that formed of sealing-wax. Any suitable plastic cement substance may be employed which will retain itself in position and hold the depolarizing substance from escaping at the ends. The depolarizing substance F preferably consists of an intimate pasty mixture of amorphous carbon, graphite, sulfate of manganese, and concentrated sulfuric acid. The preferred proportions of these ingredients are set out in my aforesaid Patent No. 585,699. If desired, the proportions of these ingredients may be varied and amorphous carbon may be omitted. My invention comprehends, broadly, the inclosing of any suitable depolarizing mixture in the structure D, and hence I do not confine myself to the particular ingredients set out in my aforesaid Letters Patent.

The structure D is centrally located with reference to the zinc positive electrode B, and the depolarizing mass is held out of contact with the zinc by the insulating covering. No special means of support is necessary for the negative electrode structure, since it cannot short-circuit itself by contact with the zinc electrode. The two electrodes having been placed within the battery box or cell A a quantity of mercury K is placed in the bottom of the box A, so as to maintain the zinc electrode B in an amalgamated condition on its outer surface and also form a contact between the conductor C and the bottom of the zinc. The electrolyte L of the battery is preferably dilute sulfuric acid.

By this construction the battery is exceedingly simple, is easily made, and durable in use. It is, furthermore, cheap to construct and compact in form.

While I prefer the construction shown, I do not limit myself to the minor details thereof, as they may be modified in various ways without departing from the principle of my invention.

Having now described my invention, what I claim as new, and desire to secure by Letters Patent, is—

1. In a negative electrode structure for a battery, the combination of a central carbon conductor, a hard sealing-stopper tightly surrounding the conductor at a distance from its upper end, a second hard sealing-stopper covering and surrounding the lower end of the conductor, a depolarizing mass surrounding the carbon conductor and interposed between the sealing-stoppers, an inclosing wrapper of a thin asbestos sheet surrounding the depolarizing mass and peripheries of the stoppers and tightly wrapped about them and upon itself to form a strong case, and a wrapping-strand tightly binding the asbestos wrapper at close intervals throughout its length to the depolarizing mass and to the stoppers and preventing undue expansion.

2. A negative electrode for a battery comprising a central conductor having its body embedded in a mass of depolarizing substance, and means for holding the depolarizing mass in position upon the central conductor consisting of two sealing-stoppers cemented to the central conductor, a wrapper of a thin asbestos sheet wrapped upon itself and tightly about the depolarizing mass, and a wrapping-strand of non-corrodible substance bound tightly upon the wrapper at close intervals throughout its entire length.

3. In a battery the combination of a case or box, a tubular zinc electrode, a central negative electrode structure comprising a conductor, a surrounding mass of depolarizing plastic material, a wrapper of non-corrodible flexible porous material for holding the depolarizing substance to the conductor and insulating it from the tubular zinc electrode, stoppers or sealing-plugs at top and bottom of the wrapper and forming sealed joints between it and the electrode conductor and completely shielding the latter at the bottom, a tight wrapping-strand of non-corrodible material binding the wrapper of flexible porous material to the depolarizing plastic material and plugs at close intervals throughout its entire length to prevent undue expansion, an electrolyte in which the said zinc electrode and the negative electrode structure are immersed, an unprotected conductor leading from the top of the battery-box to the bottom thereof and forming an electrical connection with the zinc electrode, and a body of mercury in contact with the lower part of the zinc electrode and terminal of the conductor.

4. In a battery, the combination of a case or box, a tubular zinc electrode, a central negative electrode structure comprising a carbon conductor, a surrounding mass of depolarizing substance composed of pasty mixture of amorphous carbon graphite sulfate of manganese and concentrated sulfuric acid, and a flexible wrapper of asbestos for holding the soft depolarizing substance to the conductor and insulating it from the tubular zinc electrode, a tight wrapping-strand passed about the wrapper at close intervals in its length, wax stoppers at each end of the wrapper, and an electrolyte in which the said zinc electrode and the negative electrode structure are immersed.

In testimony of which invention I have hereunto set my hand.

LEON W. PULLEN.

Witnesses:
R. M. HUNTER,
J. W. KENWORTHY.